United States Patent
Tevosyan et al.

(10) Patent No.: US 10,965,449 B2
(45) Date of Patent: Mar. 30, 2021

(54) AUTONOMOUS SECRETS MANAGEMENT FOR A KEY DISTRIBUTION SERVICE

(71) Applicant: MICROSOFT TECHNOLOGY LICENSING, LLC, Redmond, WA (US)

(72) Inventors: Kahren Tevosyan, Redmond, WA (US); Kamran Riaz Khan, Redmond, WA (US); Brian S. Lounsberry, Kenmore, WA (US); Cristian Stefan Salvan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/995,087

(22) Filed: May 31, 2018

(65) Prior Publication Data
US 2019/0372758 A1    Dec. 5, 2019

(51) Int. Cl.
*H04L 9/00* (2006.01)
*H04L 9/08* (2006.01)
*H04L 9/32* (2006.01)

(52) U.S. Cl.
CPC .......... *H04L 9/083* (2013.01); *H04L 9/0822* (2013.01); *H04L 9/0861* (2013.01); *H04L 9/3213* (2013.01); *H04L 9/0841* (2013.01)

(58) Field of Classification Search
CPC .................................................. G06Q 20/354
See application file for complete search history.

(56) References Cited

U.S. PATENT DOCUMENTS

| | | | |
|---|---|---|---|
| 9,252,947 B1* | 2/2016 | Beacham | H04L 61/1511 |
| 10,341,485 B1* | 7/2019 | Patel | H04L 65/1003 |
| 2007/0094503 A1* | 4/2007 | Ramakrishna | H04L 63/18 713/172 |
| 2015/0178504 A1* | 6/2015 | Nystrom | G06F 9/45533 713/2 |
| 2017/0187521 A1* | 6/2017 | Fitch | H04L 67/02 |
| 2017/0255932 A1* | 9/2017 | Aabye | H04L 63/06 |
| 2020/0280449 A1* | 9/2020 | Shankar | H04L 9/3242 |

* cited by examiner

*Primary Examiner* — Josnel Jeudy
(74) *Attorney, Agent, or Firm* — Shook, Hardy & Bacon L.L.P.

(57) ABSTRACT

Various methods and systems are provided for autonomous secrets management for a key distribution service ("KDS"). A KDS server performs centralized management and distribution of keys for client devices in a distributed computing system, which obviates key management and distribution at the client devices. In operation, a key request is received at a KDS server from a KDS client device. The key request is generated using a data protector and a KDS client component of the KDS client device. The key request is associated with a caller and a security token of the caller. The caller is authenticated at a security token service (STS) based on a security token. An encryption key or decryption key associated with the key request is generated. The encryption key or the decryption key is generated based on an interval-based key derivation scheme. The encryption key or the decryption key is communicated to KDS client.

20 Claims, 11 Drawing Sheets

AUTONOMOUS SECRETS MANAGEMENT FOR A KEY DISTRIBUTION SERVICE

BACKGROUND

Users often rely on applications and services to perform computing tasks. Cloud computing and storage solutions are computing architectures that support network access to a shared pool of configurable computing resources for providing applications and services. A distributed computing infrastructure or cloud computing platform can support building, deploying and managing the application and services. An increasing number of users and enterprises are moving away from traditional computing architectures to run their applications and services on distributed computing systems. Distributed computing systems aim to efficiently and securely operate when utilizing cloud resources. Generally, secrets such as certificates, passwords, storage account keys, shared access signatures (SAS), and the like have a life cycle. At the end of life, the secret can expire or otherwise become invalid or untrusted. As such, secrets need to be renewed from time to time. In distributed computing system where resources such as data, applications, service, and secrets operate in a distributed manner, managing such distributed secrets poses various challenges.

SUMMARY

Embodiments of the present invention relate to methods, systems, and computer storage media for providing a key distribution service in a distributed computing system. By way of background, a data protection application programming interface ("data protector") provides encryption and decryption functionality to support protecting data at a client device. The data protector may further include additional functionality to protect data in distributed computing systems. For example, the data protector may allow sharing of secrets, such that data that is initially protected on a first computer may be subsequently unprotected on a second computer. Thus, the data protector facilitates distributed computing system applications and services that operate in a distributed manner and need distributed encryption and decryption of data. The data protector may also operate using cloud-based identities and a security token service.

In a conventional implementation of the data protector, the data protector also operates at the client to manage keys and credentials as part of the encryption process. As mentioned, a common challenge with encryption and decryption of data is managing and rotating secrets. For example, the data protector at the client may have to track symmetric keys so that a particular version of the key that was used to protect data may be used to decrypt or re-encrypt data. Additionally, compliance reasons, breach scenarios, additional configurations, ad hoc user, application and service variations of data protector key management in a distributed manner are all considerations that highlight the actual and potential shortcomings of implementations of a data protector in conventional distributed computing systems. As such, a comprehensive system that addresses the challenges identified above and other challenges is integral to providing autonomous secrets management functionality.

Embodiments described in the present disclosure are directed towards technologies for improving secrets management using a key distribution service that provides autonomous secrets management for a data protector. At a high level, the key distribution service provides centralized and standardized management of keys used in data protection via a data protector on a client device. In particular, keys, which are used by the data protector to perform encryption and decryption of data at the client, are autonomously managed away from the data protector. The key distribution service provides protector encryption keys and protector decryption keys ("keys"). The key distribution service is implemented to ensure that a client that no longer satisfies a set of claims loses access to new data protected using the keys after a predefined time interval. Therefore, the keys for each set of claims may also change periodically; however, old keys cannot be deleted since a legitimate client may want to unprotect data that was protected with an old protector key.

The key distribution service may be implemented using both client-side and server-side components. For example, the client components of the key distribution service operate with a data protector at the client and key distribution server operations manage encryption and decryption scenarios and corresponding keys in a distributed computing system. The key distribution server operations may be implemented using a key distribution server component having a key operations component and a root key store. A security token service may also be implemented as part of the key distribution service as an identity provider. Accordingly, the performance improvement of computing operations may be associated with off-loading key management from a data protector on a client to the key distribution server that provides key management via centralized and standardized key distribution service operations for applications and services in a distributed computing system, in accordance with embodiments of the present disclosure, as described herein.

Accordingly, one exemplary embodiment of the present invention provides improved autonomous key management using a key distribution service in a distributed computing system. In operation, a key request is received at a KDS server from a KDS client device. The key request is generated using a data protector and a KDS client component of the KDS client device. The key request is associated with a caller and a security token of the caller. The caller is authenticated at a security token service (STS) based on a security token. An encryption key or decryption key associated with the key request is generated. The encryption key or the decryption key is generated based on an interval-based key derivation scheme. The encryption key or the decryption key is communicated to KDS client.

As such, the embodiments described herein improve computing operations for autonomous key management for a key distribution service in a distributed computing system. For example, key operations are performed at a key distribution service server component and the data protector performs encryption and decryption operations with the eliminated burden of managing keys; thus both the key distribution service and the data protector operate more efficiently. In this regard, the key distribution service addresses the specific problem of managing keys and improves the existing key management processes in distributed computing systems.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
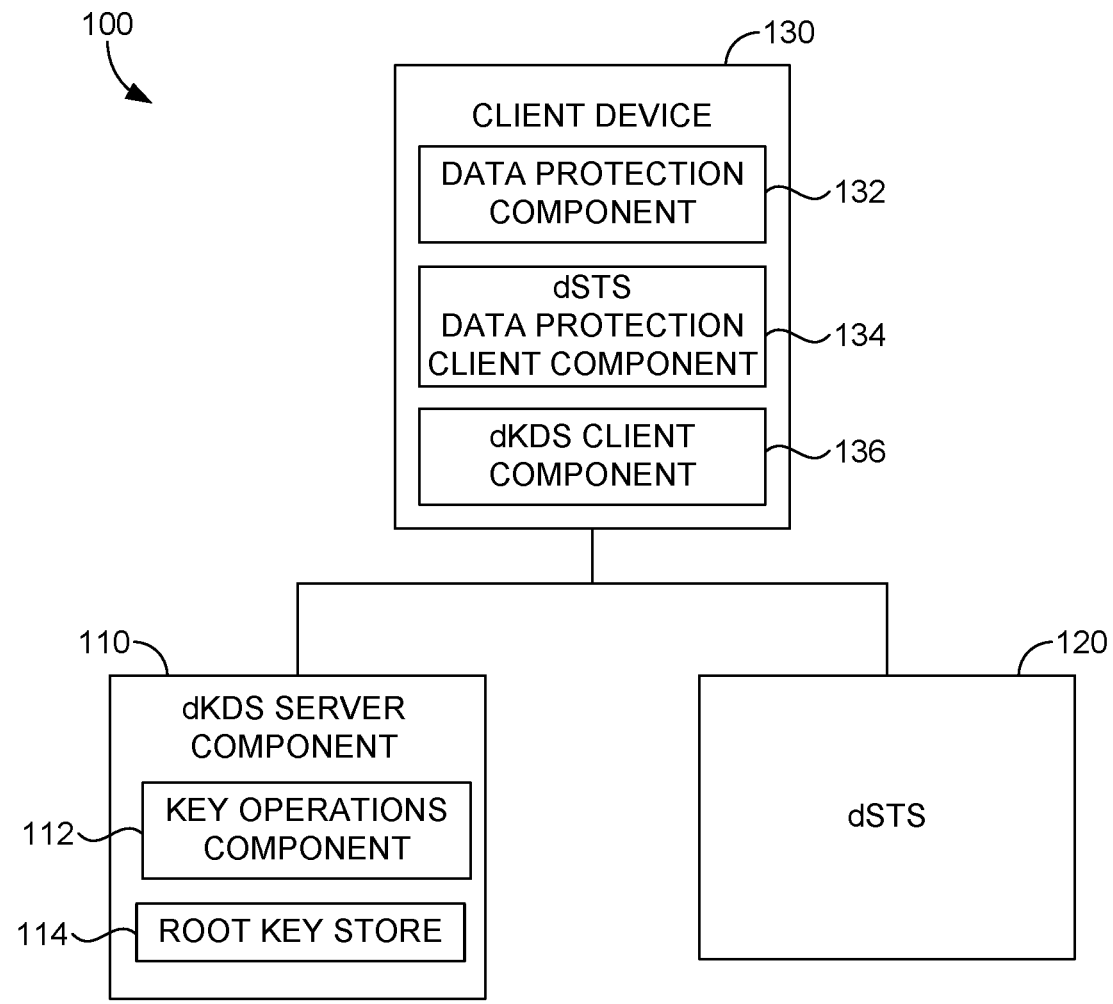
FIG. 1 is a block diagram of an autonomous secrets management system for a key distribution service, in accordance with embodiments described herein.

Distributed computing systems aim to efficiently and securely operate when utilizing cloud resources. By way of background, a data protection application programming interface (DPAPI) ("data protector") is an API that supports protecting data at a client device. In particular, the data protector includes two functions, a function that performs encryption of data and a function that performs decryption of data. Typically, only a user with the same logon credential as the user who encrypted the data can decrypt the data. The decryption function decrypts and executes an integrity check on the data. In addition, the encryption and decryption usually must be done on the same computer.

Distributed computing systems, however, often require that content encrypted on one computer be decrypted on another computer. The data protector also includes an update (i.e., DPAPI-NG or Cryptography NG DPAPI) that supports this functionality in the distributed computing system. In particular, the data protector enables secure sharing of secrets (i.e., keys, passwords, key material) and messages protecting them to a set of security mechanisms (e.g., Active Directory or web credentials) that can be used to unprotect them on different computer after proper authentication and authorization. Data protection operations (e.g., encryption and decryption) are provided using the security mechanisms and policies that are passed into a function call, a policy defines which user can decrypt the data and therefore which key should be used. The data protector support protection descriptors (i.e., sequential list of one or more protectors) expressed in a string based language called protection descriptor string. The data protection operation can be based on a router-provider framework where a router component calls a provider component to encrypt a content encryption key for encrypting selected data. The data protection may implement a specified syntax (e.g., cryptographic message syntax—CMS) format to store the encrypted data, the encrypted content encryption key and provider and key identifier.

In conventional datacenters, techniques for managing secrets have several shortcomings. Generally, secrets such as certificates, passwords, storage account keys, shared access signatures (SAS), and the like have a life cycle. At the end of life, the secret can expire or otherwise become invalid and/or untrusted. As such, secrets need to be renewed from time to time. With reference specifically to the data protector, a conventional implementation manages keys and credentials as part of the encryption process at the data protector of the client. As mentioned, a common challenge with encrypting data is managing and rotating secrets. For example, the data protector at the client may have to track symmetric keys so that a particular version of the key that was used to protect data may be used to decrypt or re-encrypt data.

Additionally, compliance reasons, breach scenarios, additional configurations, ad hoc user, application and service variations of data protector key management in a distributed manner are all considerations that highlight the actual and potential shortcomings of implementations of a data protector in conventional distributed computing systems. As such, a comprehensive system that addresses the challenges identified above and other challenges is integral to providing autonomous secrets management functionality.

Embodiments described herein provide simple and efficient methods and systems for implementing key distribution service for autonomous secrets management. In particular, the key distribution service supports key distribution operations to provide the functionality described herein. At a high level, the key distribution service provides centralized and standardized management of keys used in data protection via a data protector on a client device. In particular, keys, which are used by the data protector to perform encryption and decryption of data at the client, are autonomously managed away from the data protector. The key distribution service provides protector encryption keys and protector decryption keys ("keys"). The key distribution service is implemented to ensure that a client that no longer satisfies a set of claims loses access to new data protected using the keys after a predefined time interval. Therefore, the keys for each set of claims may also change periodically; however, old keys cannot be deleted since a legitimate client may want to unprotect data that was protected with an old protector key.

The key distribution service may be implemented using both client-side and server-side components. For example, the client components (e.g., data protector—a data protection component and a dSTS data protection client component, and dKDS client component) implement key distribution service client operations for encryption and decryption scenarios and corresponding keys in a distributed computing system. The key distribution service server operations may be implemented using a key distribution server component having a key operations component and a root key store. A security token service may also be implemented as part of the key distribution service as an identity provider.

In addition, the key distribution service may operate using a key derivation scheme that provides several benefits over conventional key storage. For example, an amount of storage overhead for the key distribution service may be limited based on a key derivation scheme of the key distribution service. However, more importantly, the key derivation scheme supports deriving keys from a small set of master keys. The cryptographic properties of the key derivation scheme ensures that a protector key issued to a given set of claims cannot provide information about the protector keys issued for a different set of claims. The key derivation scheme also ensures that future protector keys for a given set of claims cannot be deduced from past and present protector keys. In this regard, the key distribution service support key creation and key derivation using key protection rules and access rights verification, with support for protection descriptor strings, as discussed herein in more detail.

Advantageously, the performance improvement of computing operations may be associated with off-loading key management from a data protector on a client to the key distribution server that provides key management via centralized and standardized key distribution service operations for applications and services in a distributed computing system. In particular, the improvement to computing operations associated with key distribution components in a distributed computing system results in computing efficiency. For example, key operations are performed at a key distribution service server component and the data protector performs encryption and decryption operations with the eliminated burden of managing keys; thus both the key distribution service and the data protector operate more efficiently.

Various terms and acronyms are used throughout this description. Although more details regarding various terms are provided throughout this description, general definitions of some terms are included below to provide examples and a clearer understanding of the ideas disclosed herein:

AES refers to an Advanced Encryption Standard.

CEK refers to Content Encryption Key.

CMS refers to Cryptographic Message Syntax which is a format for encoding encrypted messages.

CNG refers Cryptography Next Generation.

DH refers to Diffie-Hellman-Merkle cryptographic key exchange protocol.

dKDS refers to Key Distribution Service.

dSTS refers to Datacenter Security Token Service.

DPAPI refers to Data Protection Application Programming Interface.

KDF refers to Key Derivation Function which is a cryptographic primitive for deriving cryptographic keys from given seed material.

KEK refers to Key Encryption Key. KEK protects the CEK. A protected (wrapped) CEK may be written as {CEK}KEK.

PKCS refers to Public Key Cryptography Standard which is a group of security standards.

Protected blob refers to the result of protecting a secret with the dKDS. The protected blob cryptographically protects the secret from disclosure to unauthorized parties and ensures that unauthorized modifications or tampering can be detected by an authorized user.

Protection descriptor refers to a string describing a caller's intent about how a secret should be protected. The protection description may be passed as input to the data protection API, and can be recovered from a protected data blob.

Protector key refers to a cryptographic key that corresponds to a particular protector. The protector key may have the property that only the security principal represented by the protector is capable of unwrapping data that is cryptographically wrapped with the protector key. The protector key may be a symmetric key or a public key.

Protector decryption key refers to cryptographic key required to unwrap data that is wrapped with a given protector key. If the protector key is a symmetric key, then the protector decryption key is also the same key. If the protector key is a public key, then the protector decryption key is the corresponding private key. Note that possession of a protector decryption key does not necessarily enable a user to decrypt a protected blob (e.g. if the protector is part of an AND clause).

SD refers to a Security Descriptor which is a construct for expressing the authorization policy of an object (such as a file).

SDDL refers to Security Descriptor Description Language. A notation for describing SDs may be human-readable form.

With reference to FIG. 1, FIG. 1 illustrates an exemplary distributed computing system 100 in which implementations of the present disclosure may be employed. In particular, FIG. 1 shows a high level architecture of distributed computing system 100 having components in accordance with implementations of key distribution service of the present disclosure. The distributed computing system corresponds to the distributed computing system described herein with reference to FIG. 9 and FIG. 10. Among other managers, components, or engines (collectively "components") not shown, the distributed computing system 100 includes dKDS server component 110 having key operations component 112 and root key store 114, dSTS 120, and client device 130 having data protection component 132, dSTS data protection client component 134, dKDS client component 136. The data protection component 132 and the dSTS data protection client component 134 may be collectively referred to as "data protector". Each of the identified components may represent a plurality of different instances of the component. The components may communicate at least some messages using the same messaging protocol. The components of the distributed computing system 100 may communicate with each other over one or more networks (e.g., public network or virtual private network "VPN"). The network (not shown) may include, without limitation, one or more local area networks (LANs) and/or wide area networks (WANs).

The components of the distributed computing system 100 may operate together to provide functionality for a key distribution service, as described herein. The distributed computing system 100 supports data encryption and decryption requests from the client device 130. The client device 130 operates with the data protection component 132 that executes data protector operations via a router provider infrastructure, the dSTS data protection client component 134 that executes dSTS data protection client operations as an identity provider, and the dKDS client component that executes dKDS client operations for encryption and decryption keys. The client device further operates with the dKDS server component 110 to exchange messages for encrypting and decrypting data without having to perform key management at the client device 130 in that the dKDS server component 110 executes dKDS server component operations to autonomously manage keys at the dKDS server component 110.

The dSTS 120 may be an identity provider that provides dSTS operations that support the key distribution service functionality. The key distribution service can include using the identity name (e.g., identity identifier) of an application or service, by way of the key distribution service components (e.g., dKDS client component 134 and dKDS server component 110) to retrieve a security token from dSTS 120. In this regard, autonomous key renewal and distribution via the key distribution service operates with the dSTS 120 as discussed in more detail below.

With reference to FIG. 1, the data protection component 132 and the dSTS data protection component (collectively "data protector") are responsible for data encryption functionality such as encrypt the data. The data protector may also support the functionality of traditional DPAPI and DPAPI-NG. The data protector is a policy based data protection API. The policy may be passed into the function call defines which user can decrypt the data and therefore which key should be used. The policy is expressed in a string based language called protection descriptor string. String based policy language data is protected using a protector string. The following is an example syntax of protector string.

Provider name:=UNICODE string
Provider value:=UNICODE string
Protector phase:=provider name=provider value
Protector phase:="provider name"="provider value"
Protector phase:=<Protector phase> AND <Protector phase>
Protection descriptor string:=<Protector phase> OR <Protector phase>

In the above definition, provider name is the name of the provider which can interpreter the protector phase. Provider value is the information that the specific provider can use to identify the key. The canonical form in the expression and that AND expression may be evaluated first. For example, using the following protector string, the data can be decrypted by either a user in the specific group or a password for user abby saved in his credential locker.

SID=<Group SID> or WebCredentials=login.live.com, abby

The data protector is implemented is a router provider infrastructure. The router calls the provider dSTS data protection component to encrypt or decrypt the content encryption key for encrypting the data. The router finds the provider image name based on the provider name from the registry. The router loads the provider dll and calls the corresponding interface implemented by the provider dll. The data protectors uses CMS format to store the encrypted data, encrypted content encryption key and provider-key identifier. The data protector may be used as the client API. The dKDS client component is plugged in through the dSTS data protection component.

The dKDS client component 136 implements two methods: "GetEncryptionKey" and "GetDecryptionKey". The "GetEncryptionKey" that retrieves the client token from dSTS 120 and creates a message in the format expected by dKDS server component 110 and makes a call to the dKDS server component 110. The method returns the encryption key blob as generated by the key generation component or an error HRESULT if an error occurs during this process. The "GetDecryptionKey" method retrieves the client token from dSTS 120 and creates the message in the format expected by dKDS and makes a call to the dKDS server component 110. The method returns the decryption key blob as generated by the key generation component (if authorized) or an error HRESULT otherwise or if an error occurs during this process. In order to optimize network traffic and server load, decryption keys may be cached locally. Encryption keys are not cached. Even when an encryption key was requested seconds ago and the L2_ID has not changed, there is a chance that the root key has been automatically rolled, so the local cache would be invalidated without the client being aware of it.

The dKDS server component 110 is responsible for dKDS server component operations that support the functionality of the key distribution service. The dKDS server component operations also include operations performed via the key operations component 112 and root key store 114. At a high level, the dKDS server component 110 may authorize key releases and generate key based on claims. The dKDS server component 110 may provide key authorization in that it may perform checks to see if a key can be generated for the client based on the client's token information and the claim the client needs to satisfy. The dKDS server component 110 also stores the root key using the root key store 114. The root key is an important secret because if the root key leaks, the key distribution service may be compromised or otherwise inoperable. In some embodiments, the dKDS server component 110 may support root key renewal such that it retains and stores multiple keys after a renewal occurs. The dKDS server component 110 may return the newest root key (when there are multiple root keys) for encryption and a key identifier (i.e., key ID). The dKDS may retrieve a root key based on its key ID if such key exists.

The dKDS server component 110 includes the key operations component 114 that is responsible for operations to perform encryption and decryption. The key operations component may generate an encryption key based on the claims. A client needs to satisfy the claims at the time of the encryption and the root key store returns the key. The encryption key may be associated with a key ID, which contains the time the key is generated, the root key ID for root key retrieval and the claim information. The key operations component may also provide the decryption key, where the decryption key may be generated by the key generation method based on the information in the key ID. The result may be returned as an opaque key blob.

The dKDS server component 110 includes the key operations component 112 that is responsible for operations to create a rook key and add a root key. A create root key function is invoked when the first key is created or during a key rolling operation. The output key needs to be stored somewhere accessible to dKDS server component 110 because the generated root keys need to be loaded when the service starts. An add root key function makes an existing root key available for key generation, for example, using the key operations component. Requests for L2 keys, as discussed below, referencing this root key can be handled after this call completes successfully.

The dKDS server component 110 supports a key derivation scheme that obviates having to track keys and keys may simple be derived using other known information. The key derivation scheme requires the following configuration parameters:

1. Key interval: This is the interval after which a new key will be issued. For example, the key interval may be fixed to a predefined time period, to coincide with a Kerberos ticket lifetime.

2. Key lifetime: This is the time for which each individual key is valid. A key that is past its lifetime may not be used to protect data. The key lifetime is generally much longer than the key interval, since a client may miss a few key intervals due to transient issues such as loss of network connectivity. The key lifetime may be fixed to the length of an L1 interval.

3. L1 iterations ($L1_{max}$): For example, fixed to 32 cycles, as discussed below.

4. L2 iterations ($L2_{max}$): For example, fixed to 32 cycles, as discussed below.

5. KDF algorithm: For example, defaults to SP 800-108 CTR_HMAC KDF, as discussed.

6. KDF parameters: These parameters are always passed to any KDF calls. In addition to these, all KDFs used with this API must support a KDF_CONTEXT parameter, which is passed as described later. Defaults to KDF_LABEL="SD key service".

7. Diffie-Hellman (DH) group parameters: For example, defaults to IPsec DH group 24. The Diffie-Hellman algorithm is used to compute a shared secret to be used as the base for the KEK on the client.

In operation, the key derivation scheme may divide a time (e.g., coordinated universal time—UTC time) into "L0 periods" where L0 period length=key interval*$L1_{max}$*$L2_{max}$. Thus, the current L0 period number can be computed by dividing the current UTC time by the L0 period length, and taking the integer part of the result. Each L0 period is divided into L1 periods of length (key interval*$L2_{max}$), and each L1 period is divided into L2 periods of length (key interval). L1 and L2 periods are numbered in chronological order, starting from 0. Thus, given a time and the above configuration parameters, the L0, L1 and L2 period numbers for that time are uniquely determined.

By way of example, the following properties of the key result from this way of dividing time into intervals:

1. An L2 key is valid for a SID key cycle duration currently set to 10 hours (DEFAULTKDSKEY-CYCLE=360000000000, given in 100 ns intervals to follow the file time format)

2. An L1 key is valid for 32 L2 intervals (32 cycles*10 hours=320 hours or approximately 13 days)

3. An L0 key is valid for 32 L1 intervals (32 cycles*320 hours=10,240 hours or approximately 426 days)

Figure 4:
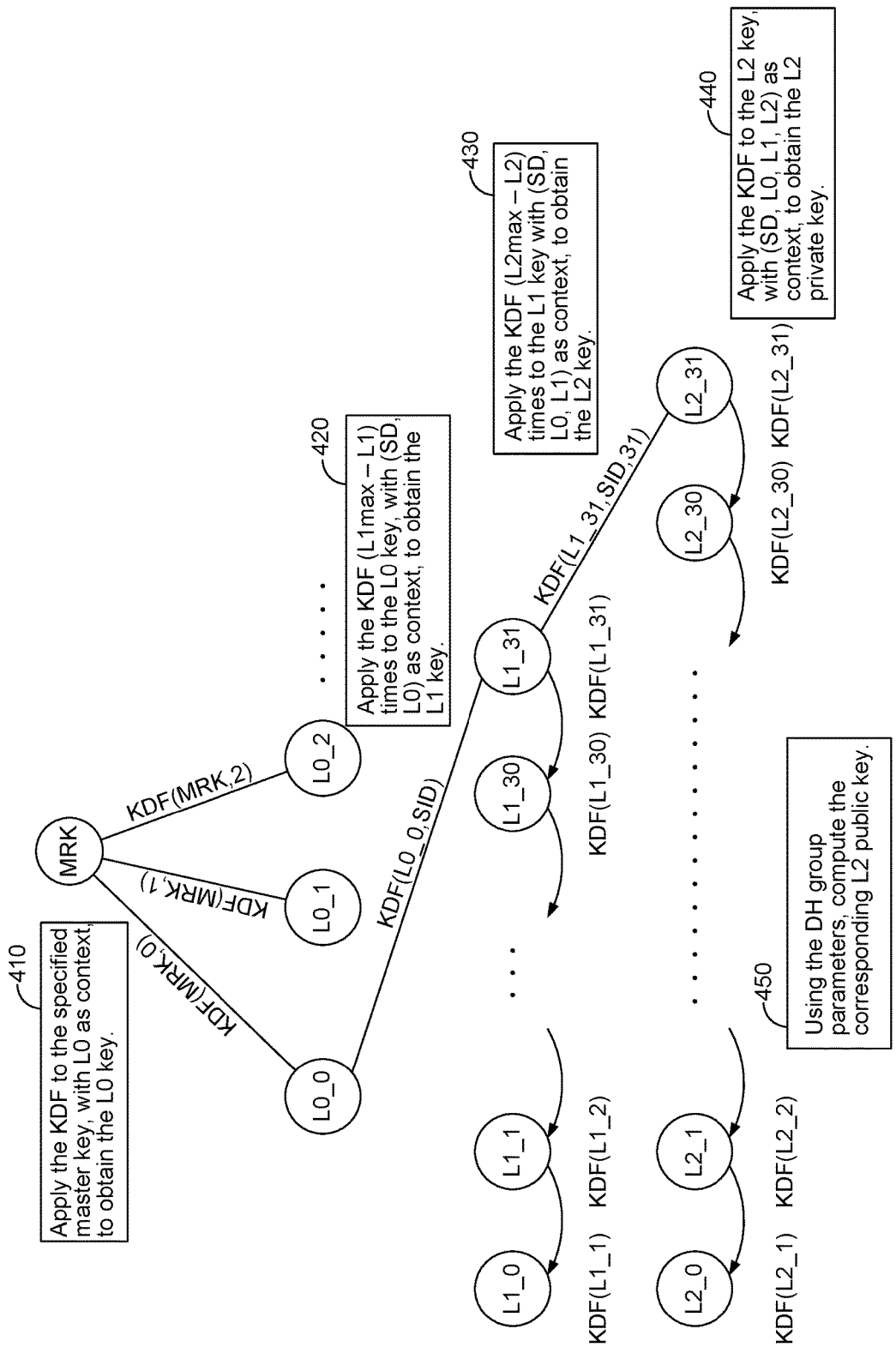
FIG. 4 is a flow diagram showing an example method for implementing a key distribution service, in accordance with embodiments described herein.

With reference to FIG. 4, FIG. 4 illustrates a schematic for computing a key, in accordance with embodiments of the present invention. Each master key is identified by a GUID. Each key is identified by the tuple (master key GUID, L0, L1, L2, claims), where L0, L1 and L2 are the respective period numbers. A key with these parameters is computed by the server in the following way:

At block 410: Apply the KDF to the specified master key, with L0 as context, to obtain the L0 key. At block 420: Apply the KDF ($L1_{max}$-L1) times to the L0 key, with (SD, L0) as context, to obtain the L1 key. At block 430: Apply the KDF ($L2_{max}$-L2) times to the L1 key with (SD, L0, L1) as context, to obtain the L2 key. At block 440: Apply the KDF to the L2 key, with (SD, L0, L1, L2) as context, to obtain the L2 private key. At block 450: Using the DH group parameters, compute the corresponding L2 public key.

Accordingly, the key derivation scheme has the following properties:

1. Given only (L0, L1, L2), the time interval of validity of a key can be determined by a simple computation.

2. Given an L1 key, all past L1 keys for that L0 period can be computed. Given an L2 key, all past L2 keys for that L1 period can be computed.

3. Given an L2 key, the corresponding L2 private key and L2 public key can be computed.

4. Given only an L2 public key, it is computationally infeasible to compute any master keys or L0/L1/L2 keys.

5. Given any number of past L1 and L2 keys, it is computationally infeasible to compute any future keys without knowledge of the master key or L0 keys. Given any L0 key, it is computationally infeasible to compute other L0 keys (past or future) without knowledge of the master key.

6. Given any number of L1 and L2 keys for a given set of claims, it is computationally infeasible to compute any keys for a different set of claims.

When the dKDS server component 110 receives a request for a key, it performs the following processing:

A. If no key identifier is specified:

1. If no currently valid L0 keys are present, derive an L0 key from the newest master key in the AD master key container. If the newest master key is invalid or corrupted (e.g. contains a KDF algorithm that cannot be loaded) then return failure. If an administrator created this key, they must have intended to stop using old master keys for encryption, so we will respect this intent.

2. Use the current L0 key to derive the L1 and L2 keys for the present time.

If the client has read and write access for the requested SD, return the current L2 key.

3. If the current L1 iteration number is less than the maximum number, then also return the previous (i.e. next higher L1 iteration number) L1 key.

4. If the client has write access for the requested SD, return the current L2 public key.

5. If the client does not have write access for the requested SD, return an error.

B. If a key identifier is specified:

1. If the time interval corresponding to (L0, L1, L2) lies entirely in the future, return an error.

2. If the caller does not satisfy all the claims in the protection descriptor claims, return an error. Since the caller is specifying a key identifier, they are requesting this key for an unprotection purpose; returning the public key would be useless.

3. If the master key GUID is not found in the master key store, return an error.

4. If the L0 period number is older than the master key's creation time, return an error.

5. Otherwise, return the most recent L1 key and the most recent L2 key (i.e. highest period number that lies in the past) for that master key and L0 period.

Thus a key blob returned from the server to the client in response to a GetKey call contains at least the following information:

1. KDF algorithm
2. KDF parameters
3. DH group parameters
4. Master key GUID for this key
5. claims for this key
6. L0 period number for this key
7. Latest L2 key (the client token satisfies all the claims in the key protection descriptor) or L2 public key (if at least one claim is not satisfied by the client security token), and its L2 period number
8. Latest L1 key (if any) in the L0 period, and its L1 period number.

It is contemplated that the dKDS server component 110 may implement key generation performance optimizations since doing multiple derivations can be expensive in terms of performance. The dKDS server component 110 will generate the minimum data required for the client to compute the L2 key.

When the L0 key is in the past, the server will return the L1max L1 key for that L0 interval. The client has to derive the proper L1 and L2 keys. It is safe to return L1max since it's not in the future, it cannot be used to derive future keys.

When the L2 ID is L2max, the L1 key for the current interval is returned, since it won't be used to generate any more L2 secrets in the future.

The dKDS client component 110 is responsible for generating the symmetrical KEK from the KDS secret. The information returned by the dKDS server component 110 (either the L2 secret or the public key corresponding to this secret) is not used directly to encrypt the KEK. Instead, a secret agreement algorithm (defaults to Diffie-Hellman key exchange algorithm) is used to generate a secret that is at the basis of the KEK.

Secret agreement algorithms may be implemented in this regard. Given two parties A and B, a secret agreement algorithm (a function get_secret(x, y)) allows them to generate a secret that can be used to encrypt further data exchanges as a symmetric key, or, even better, can be used as the base secret in a KDF transformation to obtain the symmetric key that encrypts the communication between these two parties. The steps below present a simplified version of this process.

1. B gets A's public key A_Pub
2. A gets B's public key B_Pub
3. A independently generates a secret: get_secret(B_Pub, A_Priv)
4. B independently generates the same secret: get_secret (A_Pub, B_Priv).

Figure 5:
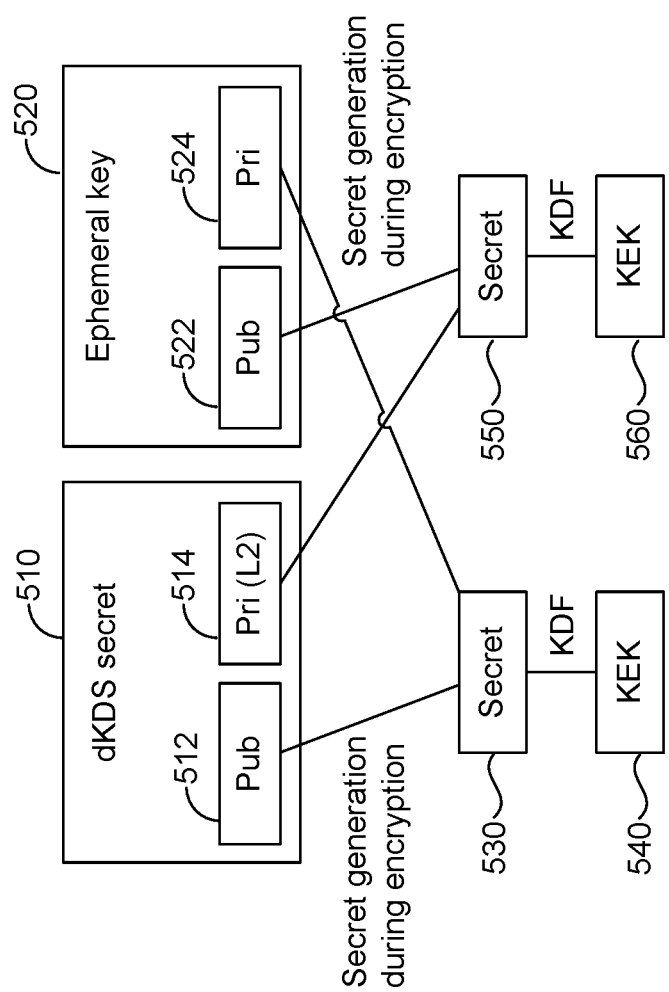
FIG. 5 is a flow diagram showing an example method for implementing a key distribution service, in accordance with embodiments described herein.

With reference to FIG. 5, the KEK generation data flow is illustrated, which illustrates encryption operations and decryption operations.

During encryption:

1. When the server returns the public key 512 for encryption (dKDS_Pub), a new private 514/public key pair is generated (called the ephemeral key 520). The specified secret agreement function is applied: secret 530=get_secret (dKDS_Pub, Ephemeral_Pri 524).
2. The ephemeral public key 522 is stored in the key context in the CMS blob to be used later for decryption, and the ephemeral private key 524 is discarded, since it's not needed anymore.
3. The secret value derived and the resulting value is the KEK 540.

During decryption:

1. The server returns the private key 512 for decryption (dKDS_Pri)
2. The ephemeral public key 522 stored in the CMS blob with the key context is now used together with the dKDS L2 key 514 to generate the secret 550. Given the properties of secret agreement algorithms, the secret is the same computed during encryption.
3. The secret value derived and the resulting value is the KEK. 560

Figure 6:
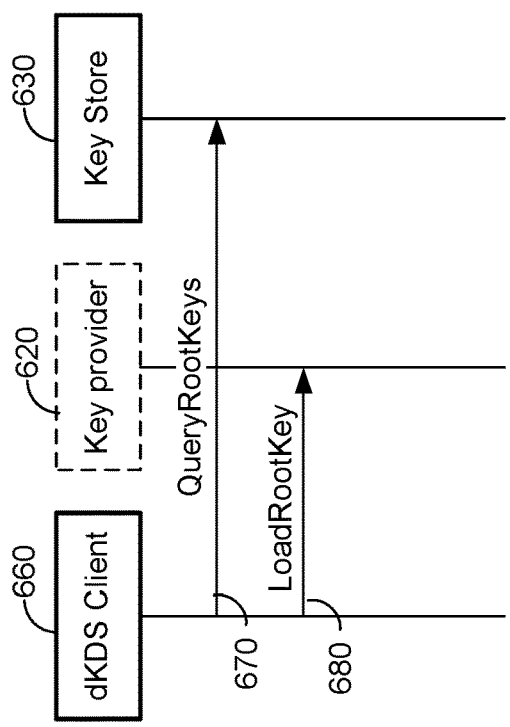
FIG. 6 is a flow diagram showing an example method for implementing a key distribution service, in accordance with embodiments described herein.
Figure 6:
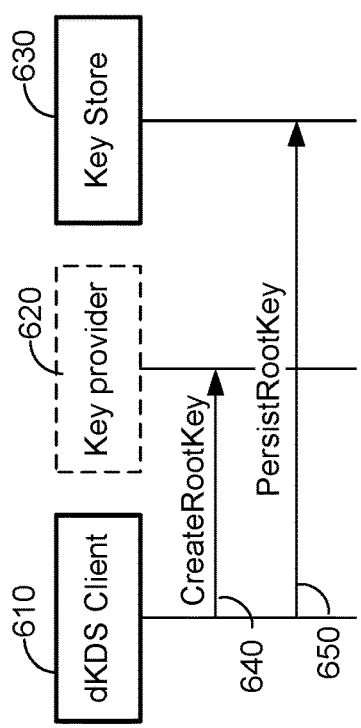

With reference to FIG. 6, the master root key operations related to master keys are illustrated. Master root keys serve as the root from which all dKDS secrets are derived. Care must be taken to prevent the leakage of these keys. The sequence diagrams illustrated with reference to FIG. 6 highlight the flow for creating and loading root keys.

Root key creation:

1. A dKDS client 610 initializes request for a new root key is needed (first key, or a new key during a key rolling operation). The dKDS client may operate based on an automated action or based on an administrator of the system.
2. The dKDS client 610, via a utility, communicates with the key provider 620 to create a new root key. The key provider 620 returns the key blob, opaque to the administrator, together with the key ID and key creation time (which are also included in the key blob).
3. The dKDS client 610 client via the utility then stores 650 this key in the secret storage to be accessed by dKDS during normal operation Loading root keys:

During startup:

1. dKDS service 660 has access to the secret repository. dKDS service 660 queries 670 the repository—key store 630—for keys created within a specified period.
2. One or more keys are handed to the key provider 620, which then is able to use them to derive secrets when the calls come in.

Figure 2:
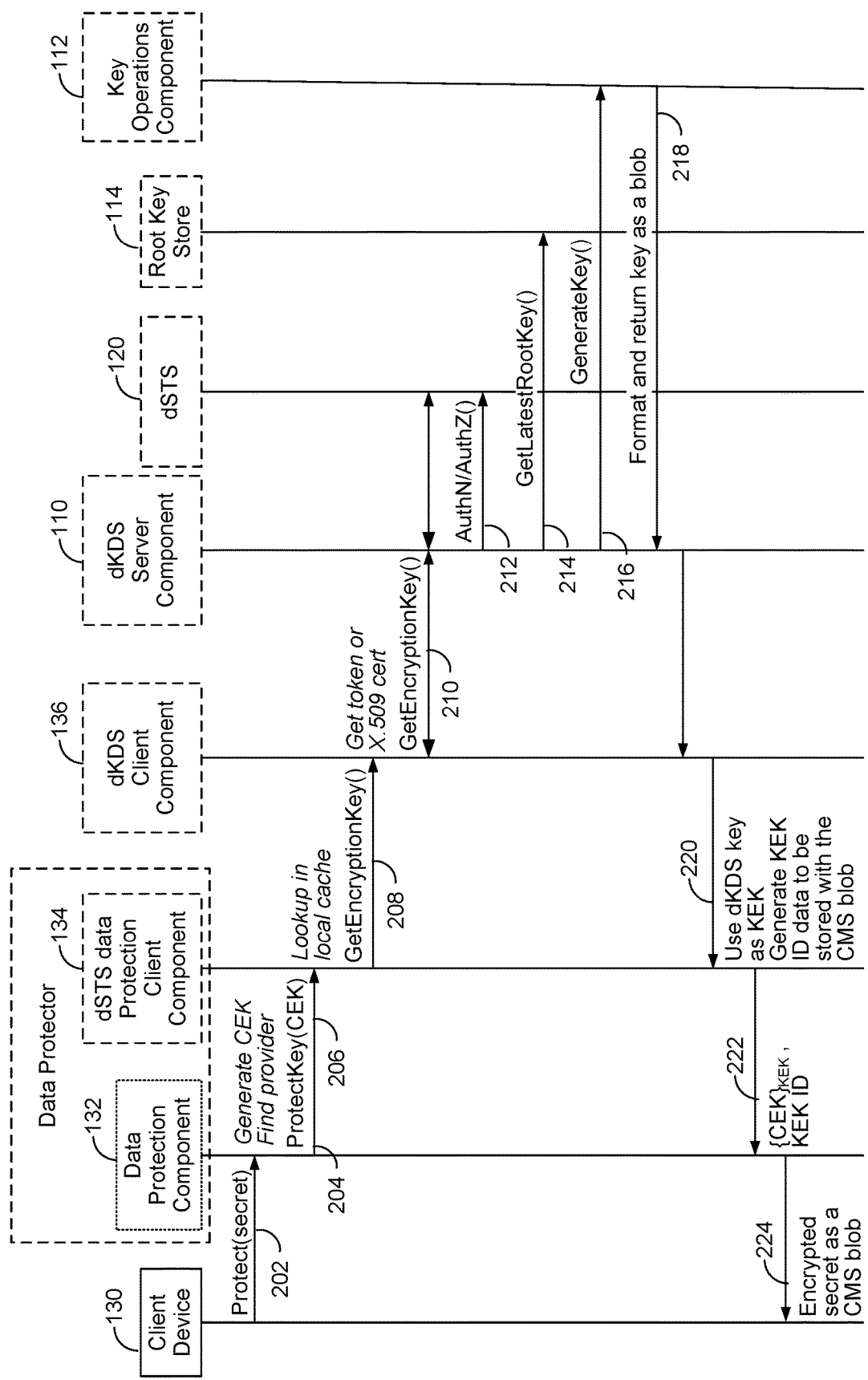
FIG. 2 is a flow diagram showing an example method for implementing a key distribution service, in accordance with embodiments described herein.

With reference to FIG. 2, FIG. 2 illustrates an example data protection sequence diagram in accordance with embodiments of the present disclosure. FIG. 2 includes client device 130, data protection component 132, dSTS data protection client component 134, dKDS client component 136, dKDS server component 110, dSTS 120, key operations component 112 and root key store 114 and. In operation, at step 202 the client 130 may create a new instance of a protection descriptor, and invokes function to protect a secret (e.g., data). At step 204, the data protection component 132 creates a new content encryption key (CEK) and allows a router of the data protection component 132 to select the proper key protection provider, based on the key protection descriptor. At step 206, the dSTS key protection provider of the dSTS data protection client component 134 is requested to protect the CEK. At step 208, the dSTS key protection provider acquires a security token from dSTS and invokes the dKDS client component 136 to retrieve the encryption key. At step 210, the dKDS client component puts together the key request data in the right format for the server such that the key request data is communicated to the dKDS server component 110. As shown, the security token may be cached on client.

At step 212, the dKDS server component 110 authenticates and authorizes the caller with the dSTS 120. At step 214, the root key is loaded at this time on the dKDS server component 110, if not already loaded. At step 216, the key corresponding to the key request data is generated. At step 218, the key is formatted and communicated as a blob by the key operations component 114. The encryption key may be returned at step 220 from the dKDS client component 136 all the way to the key protection provider of the dSTS data protection client component 134, and the data protection component 132 which wraps the CEK with the returned KEK. The data protection component 132 constructs the KEK ID structure to be stored in the encrypted blob in order to enable the decryption of data and communicates at step 224 the encrypted secret as a CMS blob.

Figure 3:
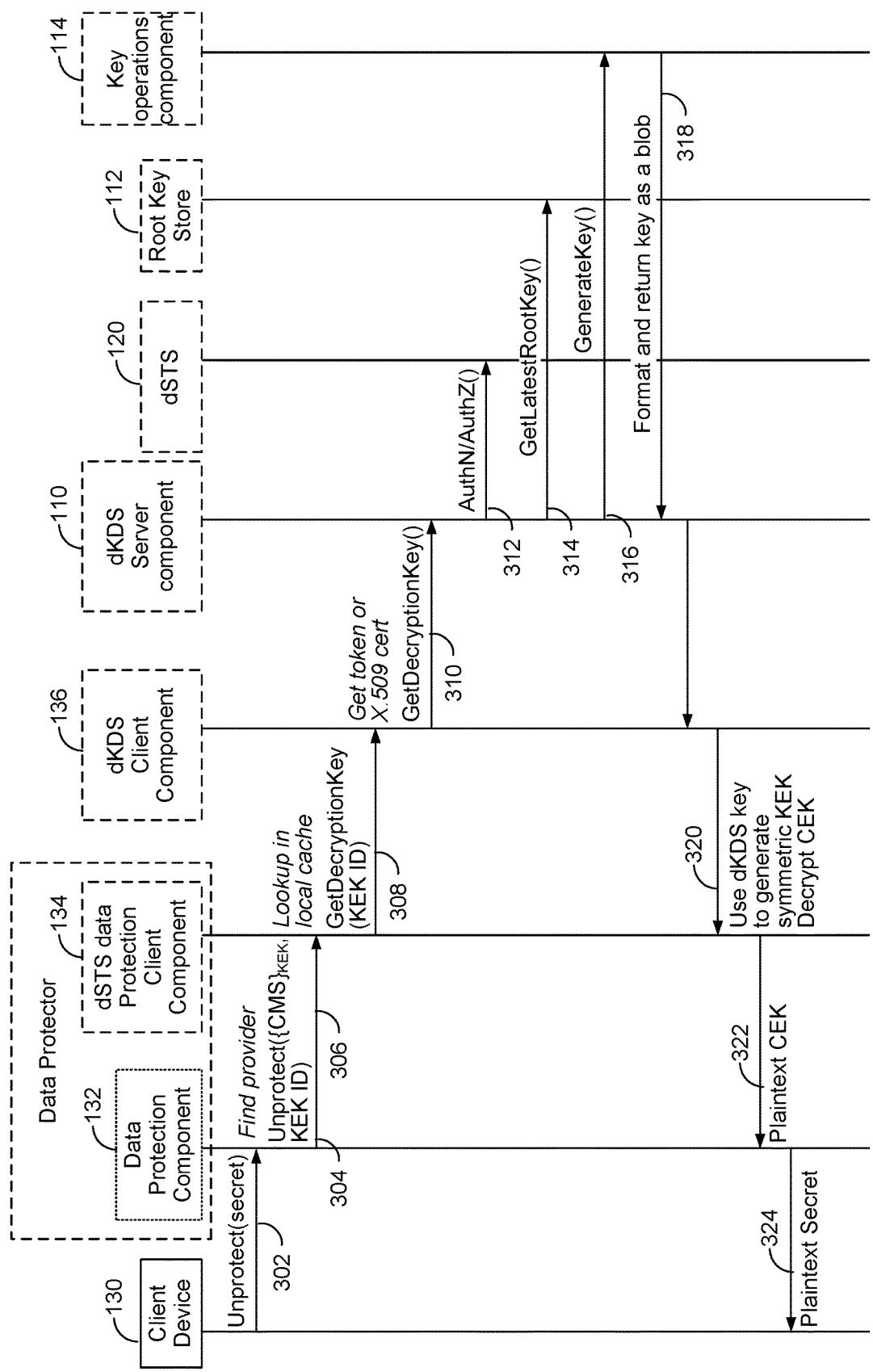
FIG. 3 is a flow diagram showing an example method for implementing a key distribution service, in accordance with embodiments described herein.

With reference to FIG. 3, FIG. 3 illustrates an example data decryption (unprotect) sequence diagram in accordance with embodiments of the present disclosure. Initially, the client device 130 may get access to a blob of data that the client device 130 interprets to represent some data that client device 130 needs to access. For example, cloud computing services communicate with each other may need to share data, encrypted data, between service components on different clients when performing service tasks. The encrypted data can shared via unsecure mechanisms (file shares, unencrypted DBs, etc.) since it is already protected. The data may represented as a CMS blob ready to be unprotected. At step 302, the client may access to a protected data blob. The client device may create a new key protection descriptor and invokes an unprotect function and passes in the protection descriptor and the CMS blob. At block 304, the data protection component 132 may parse the CMS blob, that reads the protected data and knows that it is encrypted with a CEK key that is wrapped in a way that is known to the dSTS protection component 132. At block 306, the Key Protection Provider may be asked to unprotect a key. The wrapped key and the key encryption key ID are passed to the dKDS component 136. At block 308, the dSTS key protection provider acquires a security token from dSTS (or cached) and invokes the dKDS client component 136 to retrieve the encryption key. The key protection provider of the dSTS data protection client component 134 uses the dKDS client component 136 to talk to the dKDS server component 110 and retrieve the decryption key.

At block 312, the dKDS server component 110 authorizes the request based on the claims in the token and the claims in the key descriptor. At step 314, the Root key is loaded at this time on the dKDS server component 110, if not already loaded. Only if all the claims in the key descriptor match with the keys in the security token, a decryption key is generated (the KEK ID and the claims string are used as the basis for the KEK generation). At block 318, the KEK is returned all the way to the key protection provider of the dSTS data protection client component 134, and the data protection component 132 which unwraps the CEK and returns at step 322 the CEK in clear to the data protection component 132, which the decrypts the data. At step 324, the clear text data is returned to the client.

Example Flow Diagrams

Figure 7:
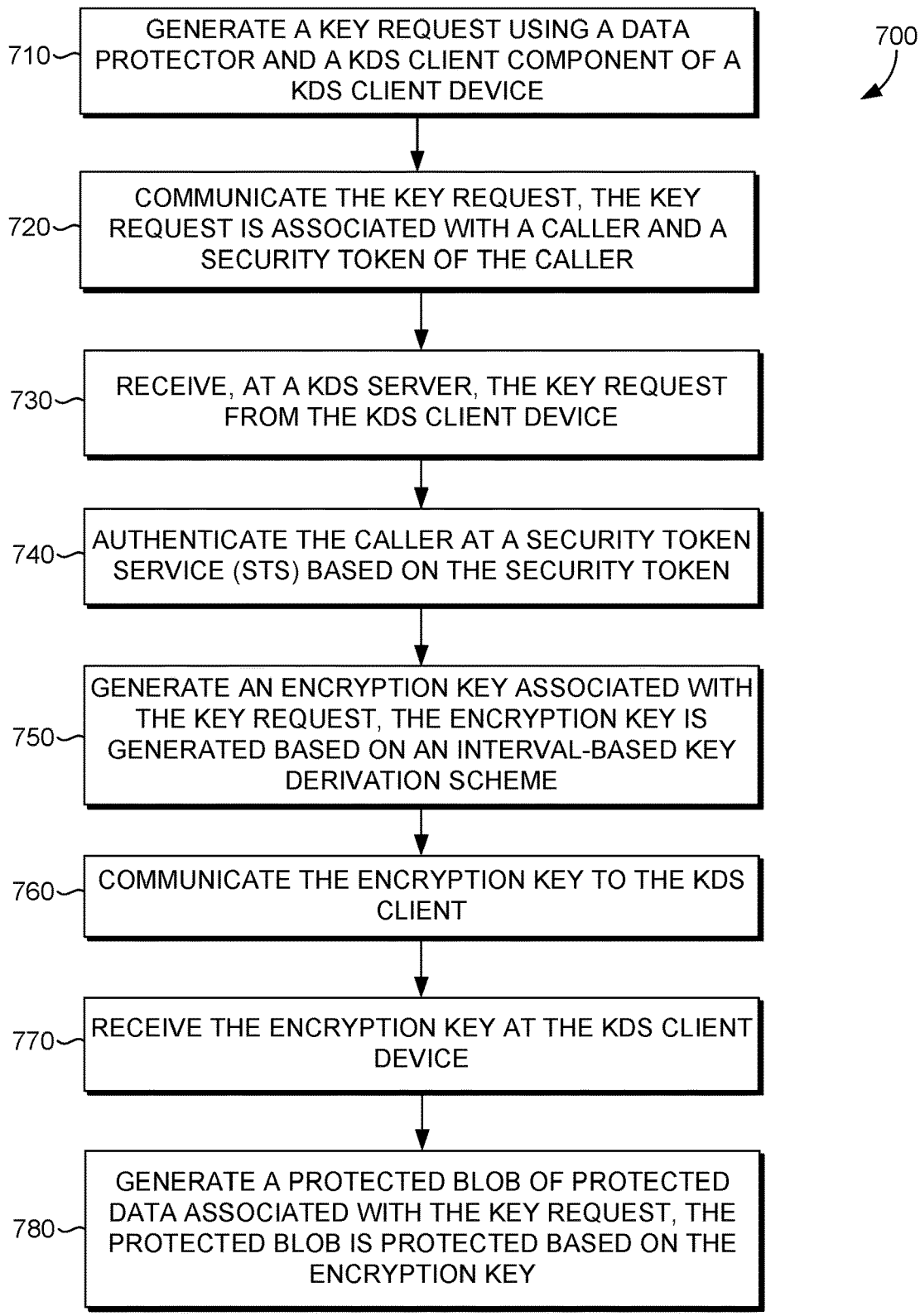
FIG. 7 is a flow diagram showing an example method for implementing a key distribution service, in accordance with embodiments described herein.
Figure 8:
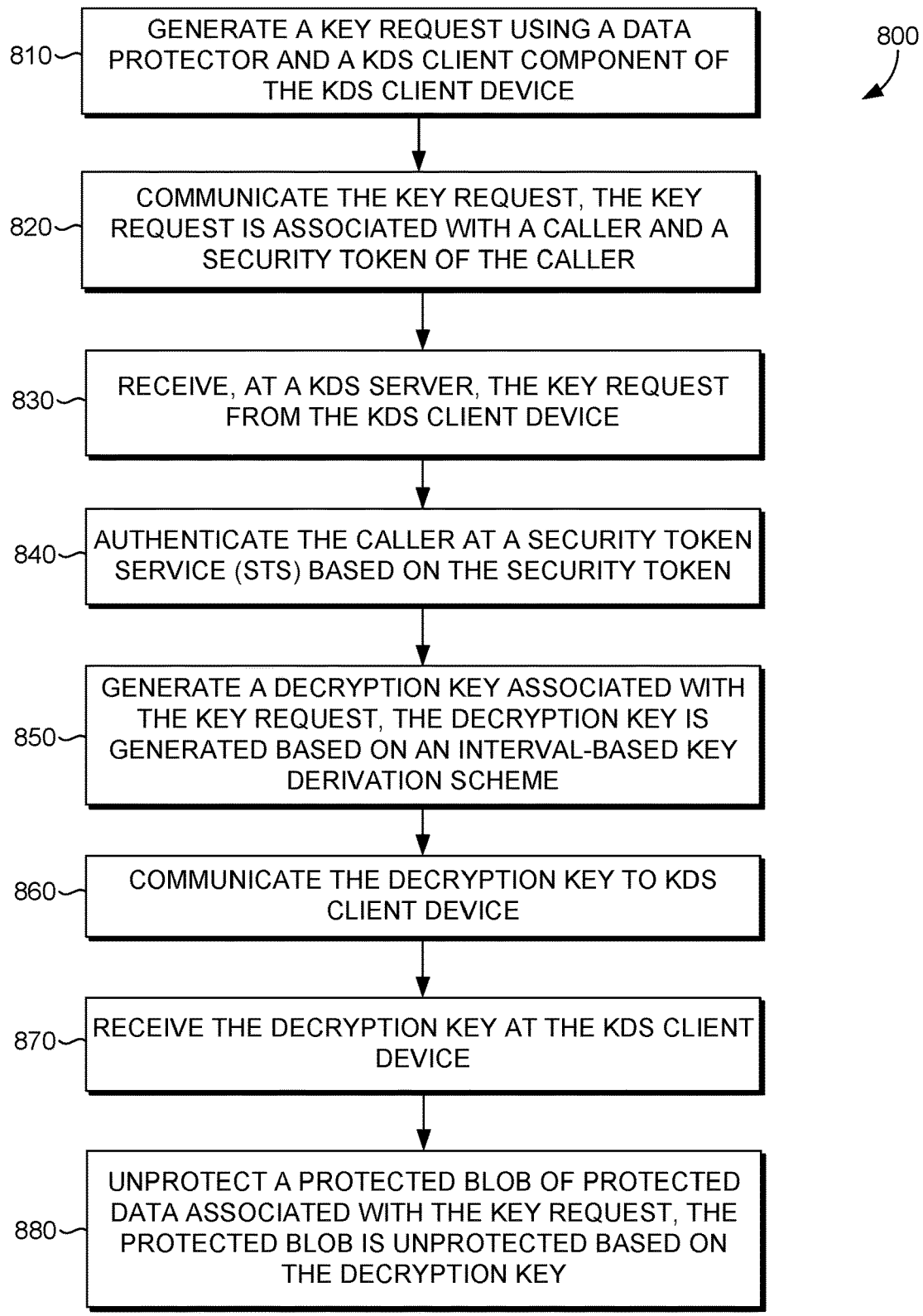
FIG. 8 is a flow diagram showing an example method for implementing a key distribution service, in accordance with embodiments described herein.
Figure 9:
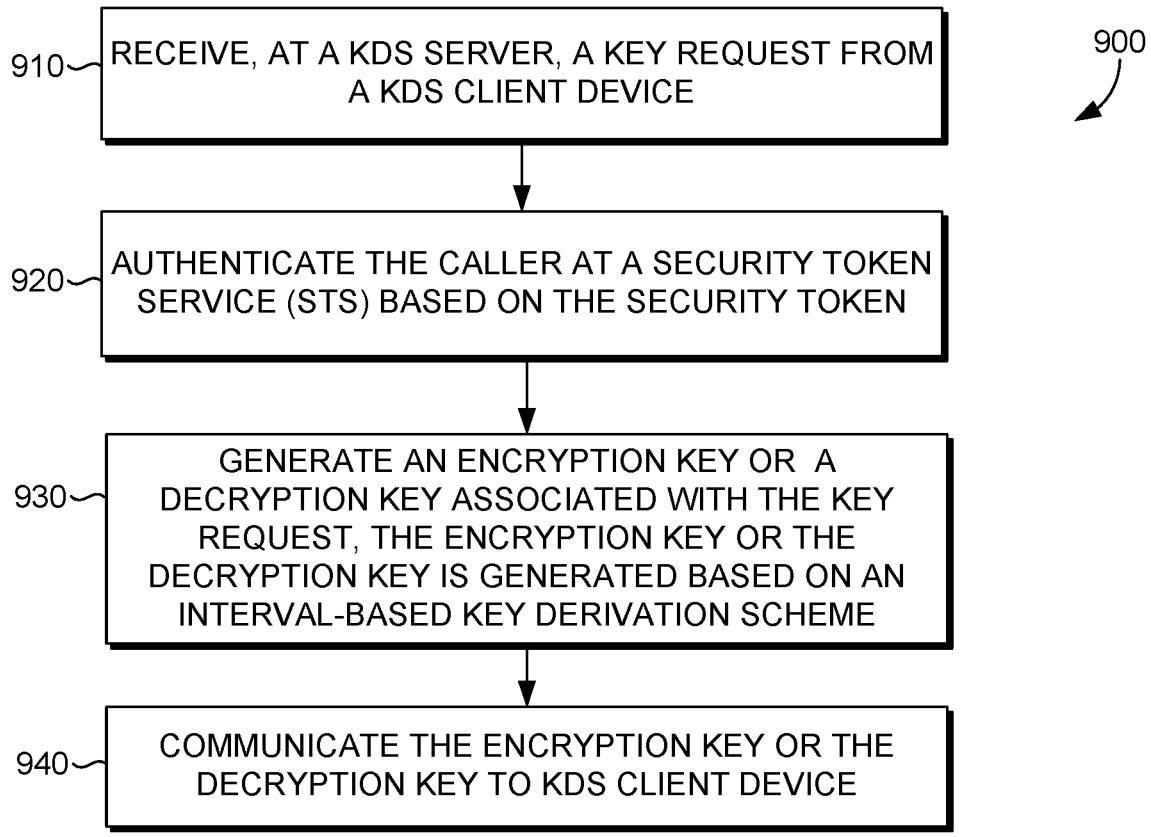
FIG. 9 is a flow diagram showing an example method for implementing a key distribution service, in accordance with embodiments described herein.

With reference to FIGS. 7, 8 and 9, flow diagrams are provided illustrating methods for providing a key distribution service in a distributed computing environment. The methods can be performed using the autonomous secrets management system described herein. In embodiments, one or more computer storage media having computer-executable instructions embodied thereon can, when executed by one or more processors, cause the one or more processors to perform the methods in the autonomous secrets management system.

Turning to FIG. 7, a flow diagram is provided that illustrates a method 700 for implementing autonomous secrets management system. Initially, a data protector accesses a content encryption key and invokes the KDS client component to retrieve the encryption key and the KDS client component accesses the security token associated with an STS. At block 710, a key request is generated using the data protector and the KDS client component of a KDS client device. At block 720, a key request is communicated; the key request is associated with a caller and a security token of the caller. At block 730, the key request is received at the KDS server from the KDS client device. At block 740, the caller is authenticated at a security token service (STS) based on the security token.

At block 750, an encryption key associated with the key request is generated. The encryption key is generated based on an interval-based key derivation scheme. The interval-based key derivation scheme comprises a key interval that indicates an interval after which a new key will be issued and a key lifetime that indicates a time period in which each individual key is valid. Generating the encryption key is based on satisfied claims of the security token, time of encryption, and a root key from a key store of the KDS server, wherein the encryption key is associated with a key identifier comprising a time of generation of the encrypted key. At block 760, the encryption key is communicated to the KDS client device. At block 770, the encryption key is received at the KDS client device. The data protector wraps the content encryption key with the encryption key and constructs a key encryption key that is stored in the protected blob. At block 780, a protected blob of protected data associated with the key request is generated, the protected blob is protected based on the encryption key.

Turning to FIG. 8, a flow diagram is provided that illustrates a method 800 for implementing autonomous secrets management system. Initially, a data protector accesses the protected blob and invokes the KDS client component to retrieve the decryption key and a KDS client component accesses a security token associated with the STS. At block 810, a key request is generated using a data protector and a KDS client component of the KDS client device. At block 820, the key request is communicated; the key request is associated with a caller and a security token of the caller. At block 830, the key request is received from the KDS client device. At block 840, the caller is authenticated at a security token service (STS) based on the security token.

At block 850, a decryption key associated with the key request is generated. The decryption key is generated based on an interval-based key derivation scheme. Generating the decryption key is based on a key identifier comprising a time of generation of a corresponding encrypted key of the decryption key. At block 860, the decryption key is communicated to KDS client device. At block 870, the decryption key is received at the KDS client device. The data protector unwraps a content encryption key with the decryption key to unprotect the protected blob. At block 880, a protected blob of protected data associated with the key request is unprotected, the protected blob is unprotected based on the decryption key.

Turning to FIG. 9, a flow diagram is provided that illustrates a method 7900 for implementing autonomous secrets management system. Initially, at block 910, a key request is received at receiving, at a Key Distribution Service (KDS) server, from a KDS client device. The key request is associated with a caller and a security token of the caller. At block 920, the caller is authenticated at a security token service (STS) based on the security token. At block 930, an encryption key or decryption key associated with the key request is generated. The encryption key or the decryption key is generated based on an interval-based key derivation scheme. At block 940, the encryption key or the decryption key is communicated to KDS client device.

Example Distributed Computing Environment

Figure 10:
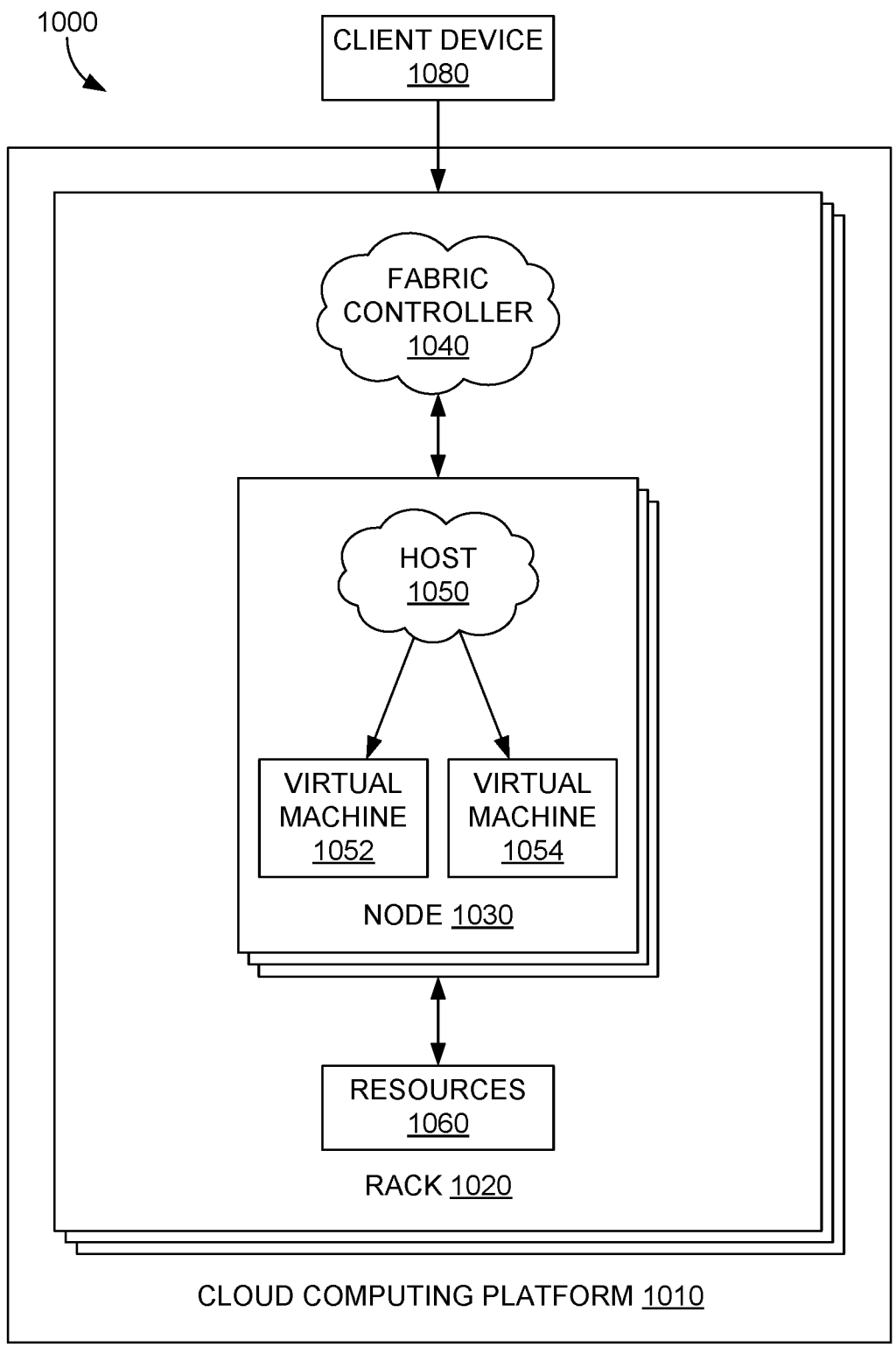
FIG. 10 is a block diagram of an example distributed computing environment suitable for use in implementing embodiments described herein.

Referring now to FIG. 10, FIG. 10 illustrates an example distributed computing environment 1000 in which implementations of the present disclosure may be employed. In particular, FIG. 10 shows a high level architecture of the secrets management system ("system") in cloud computing platform 1010, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 1000 that includes cloud computing platform 1010, rack 1020, and node 1030 (e.g., computing devices, processing units, or blades) in rack 1020. The system can be implemented with cloud computing platform 1010 that runs cloud services across different data centers and geographic regions. Cloud computing platform 1010 can implement fabric controller 1040 component for provisioning and managing resource allocation, deployment, upgrade, and management of cloud services. Typically, cloud computing platform 1010 acts to store data or run service applications in a distributed manner. Cloud computing infrastructure 1010 in a data center can be configured to host and support operation of endpoints of a particular service application. Cloud computing infrastructure 1010 may be a public cloud, a private cloud, or a dedicated cloud.

Node 1030 can be provisioned with host 1050 (e.g., operating system or runtime environment) running a defined software stack on node 1030. Node 1030 can also be configured to perform specialized functionality (e.g., compute nodes or storage nodes) within cloud computing platform 1010. Node 1030 is allocated to run one or more portions of a service application of a tenant. A tenant can refer to a customer utilizing resources of cloud computing platform 1010. Service application components of cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1030, nodes 1030 may be partitioned into virtual machines (e.g., virtual machine 1052 and virtual machine 1054). Physical machines can also concurrently run separate service applications. The virtual machines or physical machines can be configured as individualized computing environments that are supported by resources 1060 (e.g., hardware resources and software resources) in cloud computing platform 1010. It is contemplated that resources can be configured for specific service applications. Further, each service application may be divided into functional portions such that each functional portion is able to run on a separate virtual machine. In cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in cloud computing platform 1010. Client device 1080 may be any type of computing device, which may correspond to computing device 1000 described with reference to FIG. 10, for example. Client device 1080 can be configured to issue commands to cloud computing platform 1010. In embodiments, client device 1080 may communicate with service applications through a virtual Internet Protocol (IP) and load balancer or other means that direct communication requests to designated endpoints in cloud computing platform 1010. The components of cloud computing platform 1010 may communicate with each other over a network (not shown), which may include, without limitation, one or more local area networks (LANs) and/or wide area networks (WANs).

Example Computing Environment

Figure 11:
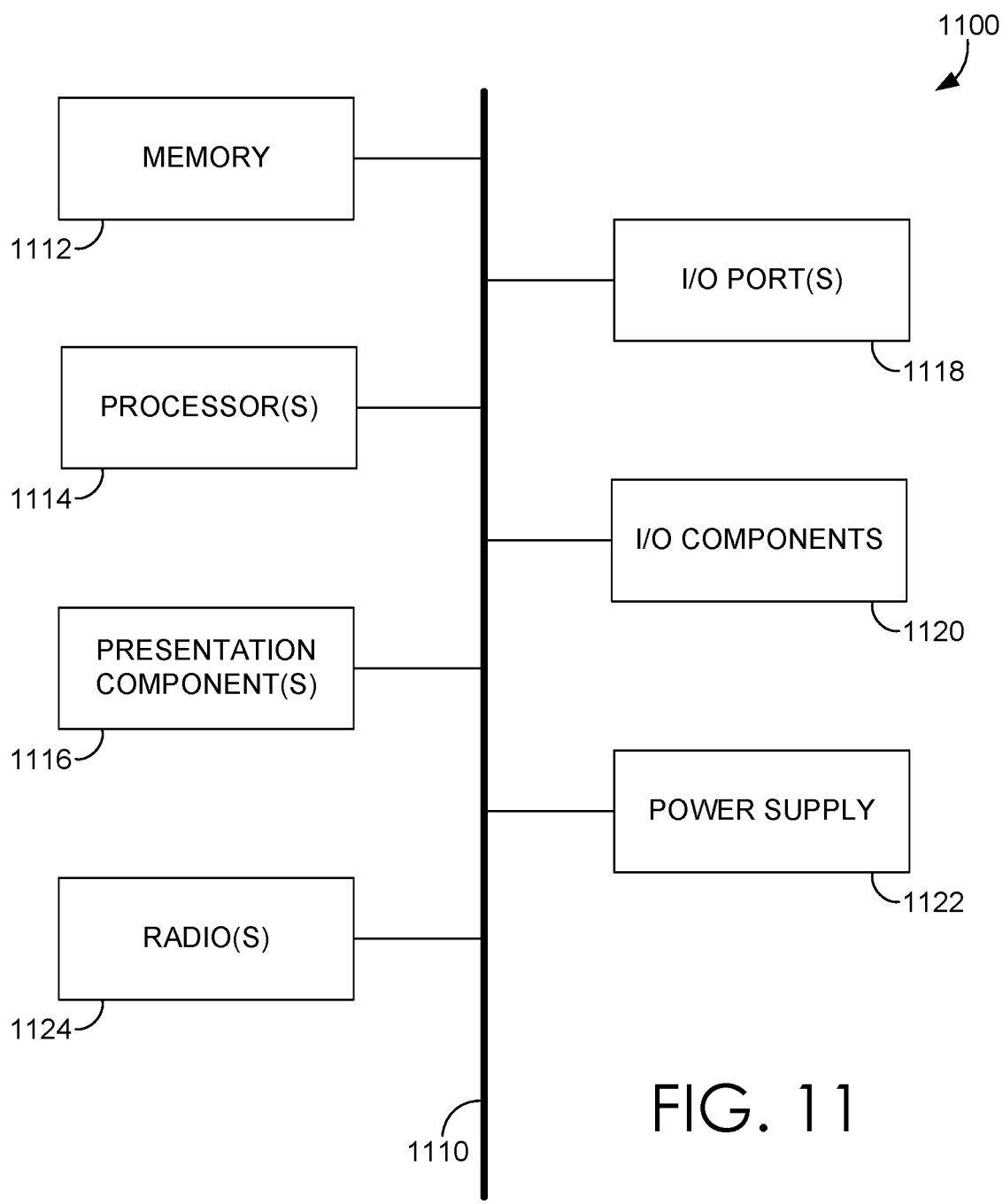
FIG. 11 is a block diagram of an example computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

With reference to the autonomous secrets management system, embodiments described herein support autonomous renewal and distribution of secrets. The autonomous secrets management system components refer to integrated components for autonomous renewal and distribution of secrets. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the autonomous secrets management system can include an API library that includes specifications for routines, data structures, object classes, and variables may support the interaction between the hardware architecture of the device and the software framework of the autonomous secrets management system. These APIs include configuration specifications for the autonomous secrets management system such that the different components therein can communicate with each other in the autonomous secrets management system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous secrets management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system for providing a key distribution service in a distributed computing system, the system comprising:
    one or more hardware processors and memory storing computer-useable instructions that, when used by the one or more hardware processors, cause the one or more hardware processors to execute:
    a Key Distribution Service (KDS) client device configured to:
    generate a key request using a data protector and a KDS client component of the KDS client device;
    communicate the key request, wherein the key request is associated with a caller and a security token of the caller;
    a Key Distribution Service (KDS) server configured to:
    receive the key request from the KDS client device;
    authenticate the caller at a security token service (STS) based on the security token;
    generate an encryption key associated with the key request, wherein the encryption key is generated based on an interval-based key derivation scheme, wherein generating the encryption key is based on satisfied claims of the security token; and
    communicate the encryption key to the KDS client device; and
    the KDS client device configured to:
    receive the encryption key; and
    generate a protected blob of protected data associated with the key request, wherein the protected blob is protected based on the encryption key.

2. The system of claim 1, wherein the data protector accesses a content encryption key and invokes the KDS client component to retrieve the encryption key.

3. The system of claim 2, wherein the KDS client component accesses the security token associated with the STS and generates the key request comprising the security token.

4. The system of claim 2, wherein the data protector wraps the content encryption key with the encryption key and constructs a key encryption key that is stored in the protected blob.

5. The system of claim 1, wherein the interval-based key derivation scheme comprises a key interval that indicates an interval after which a new key will be issued and a key lifetime that indicates a time period in which each individual key is valid.

6. The system of claim 1, wherein generating the encryption key is based on satisfied claims of the security token, a time of encryption, and a root key from a key store of the KDS server, wherein the encryption key is associated with a key identifier comprising a time of generation of the encrypted key.

7. The system of claim 1, wherein the KDS server performs centralized management and distribution of keys for client devices in the distributed computing system, which obviates key management and distribution using data protectors at the client devices.

8. A computer system for providing a key distribution service in a distributed computing system, the method comprising:
    one or more hardware processors and memory;
    storing computer-useable instructions that, when used by the one or more hardware processors, cause the one or more hardware processors to execute:
    a Key Distribution Service (KDS) client device configured to:
    generate a key request using a data protector and a KDS client component of the KDS client device;
    communicate the key request, wherein the key request is associated with a caller and a security token of the caller;
    a Key Distribution Service (KDS) server configured to:
    receive the key request from the KDS client device;
    authenticate the caller at a security token service (STS) based on the security token;
    generate a decryption key associated with the key request, wherein the decryption key is generated based on an interval-based key derivation scheme, wherein generating the decryption key is based on satisfied claims of the security token; and
    communicate the decryption key to KDS client device;
    the KDS client device configured to:
    receive the decryption key; and
    unprotect a protected blob of protected data associated with the key request, wherein the protected blob is unprotected based on the decryption key.

9. The system of claim 8, wherein the data protector accesses the protected blob and invokes the KDS client component to retrieve the decryption key.

10. The system of claim 9, wherein the KDS client component accesses the security token associated with the STS and generates the key request.

11. The system of claim 8, wherein the data protector unwraps a content encryption key with the decryption key to unprotect the protected blob.

12. The system of claim 8, wherein the interval-based key derivation scheme comprises a key interval that indicates an interval after which a new key will be issued and a key lifetime that indicates a time period in which each individual key is valid.

13. The system of claim 8, wherein generating the decryption key is based on a key identifier comprising a time of generation of a corresponding encrypted key of the decryption key.

14. The system of claim 8, wherein the KDS server performs centralized management and distribution of keys for client devices in the distributed computing system, which obviates key management and distribution using data protectors at the client devices.

15. A computer-implemented method for providing a key distribution service in a distributed computing system, the method comprising:
    receiving, at a Key Distribution Service (KDS) server, a key request from a KDS client device, wherein the key request is associated with a caller and a security token of the caller;

authenticating the caller at a security token service (STS) based on the security token;

generating an encryption key or decryption key associated with the key request, wherein the encryption key or the decryption key is generated based on an interval-based key derivation scheme, wherein generating the encryption key is based on satisfied claims of the security token; and communicating the encryption key or the decryption key to KDS client device.

16. The method of claim 15, wherein the KDS server performs centralized management and distribution of keys for client devices in a distributed computing system, which obviates key management and distribution using data protectors at the client devices.

17. The method of claim 15, wherein generating the encryption key is based on satisfied claims of the security token, time of encryption and a root key from a key store, wherein the encryption key is associated with a key identifier comprising a time of generation of the encrypted key.

18. The method of claim 15, wherein generating the decryption key is based on a key identifier comprising a time of generation of a corresponding encrypted key of the decryption key.

19. The method of claim 15, wherein the interval-based key derivation scheme is executed based on a key interval that indicates an interval after which a new key will be issued.

20. The method of claim 15, wherein the interval-based key derivation scheme is executed based on key lifetime that indicates a time period in which each individual key is valid.

* * * * *